July 1, 1930.　　　G. MANIERRE　　　1,768,852
LOADING MACHINE
Filed July 31, 1926　　　5 Sheets-Sheet 1
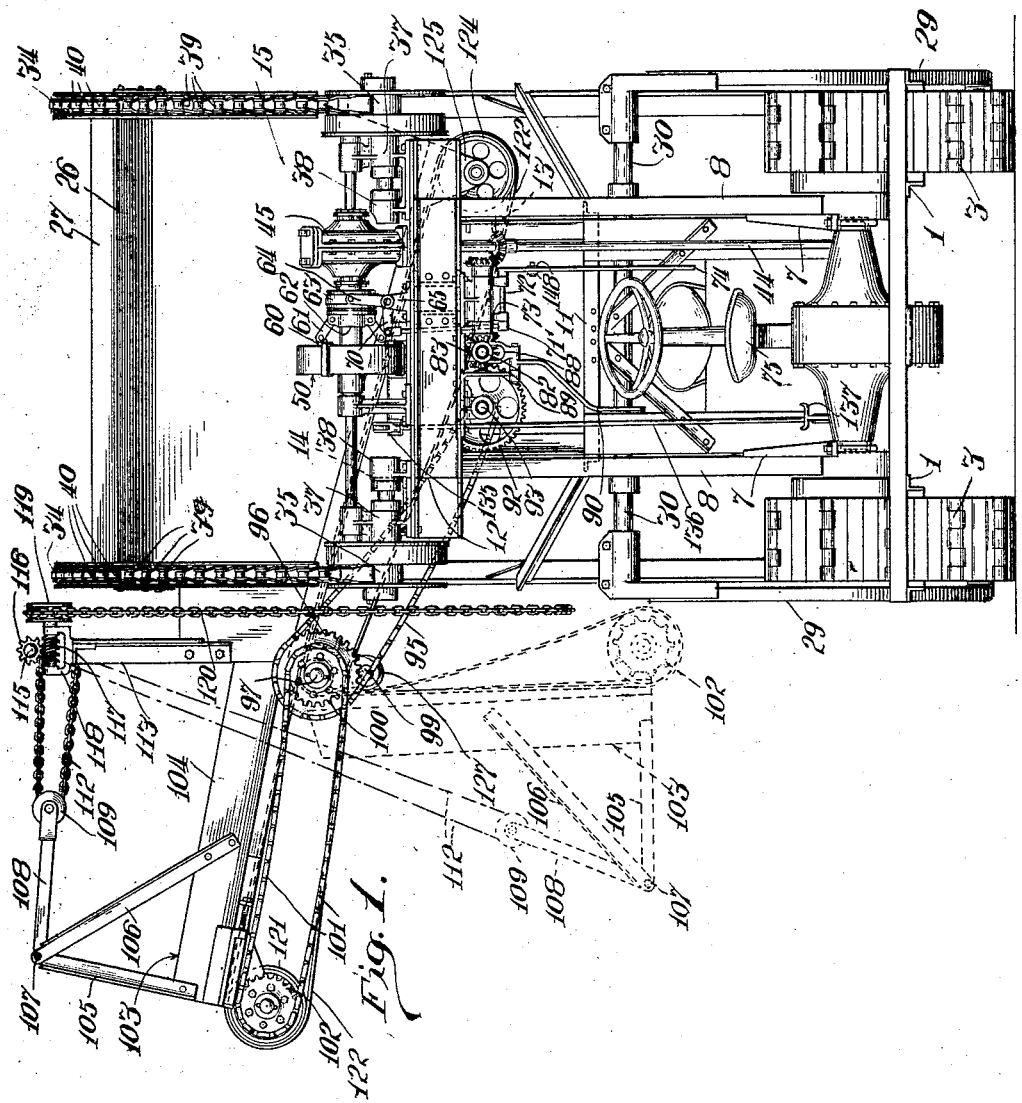
Inventor.
George Manierre
By Daniel Brennan
Attorney July 1, 1930.    G. MANIERRE    1,768,852
LOADING MACHINE
Filed July 31, 1926    5 Sheets-Sheet 2
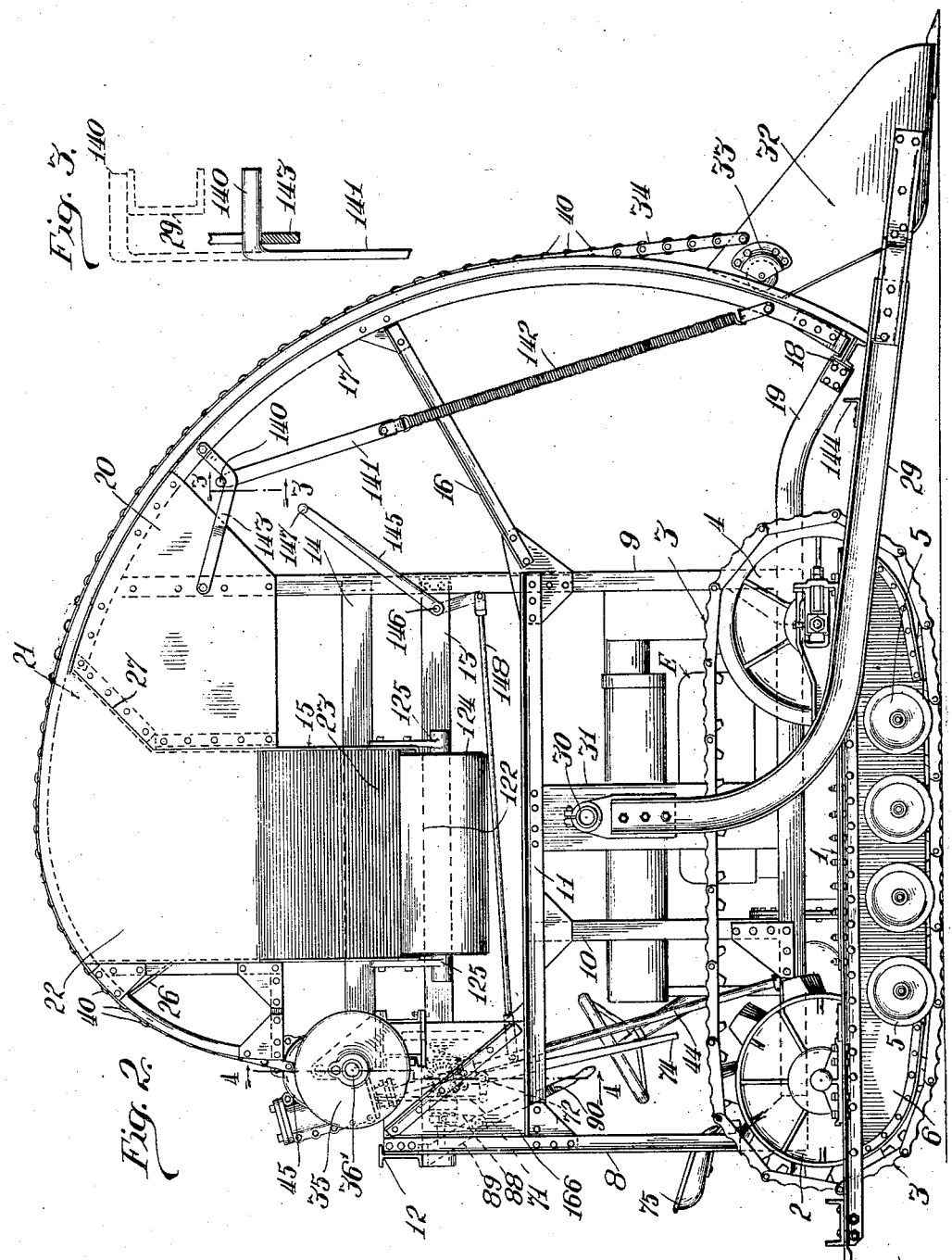
Inventor.
George Manierre
by Daniel P. Brennan
Attorney.

July 1, 1930.                G. MANIERRE                1,768,852
                             LOADING MACHINE
                           Filed July 31, 1926          5 Sheets-Sheet 3
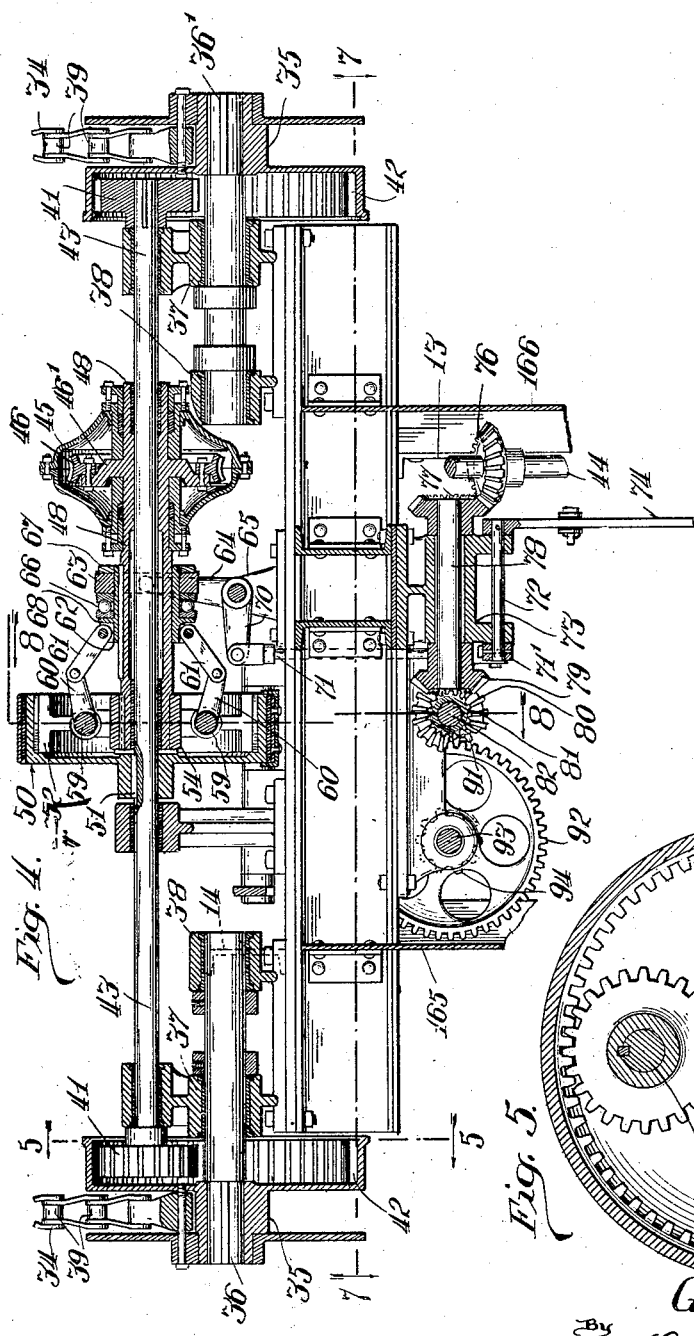
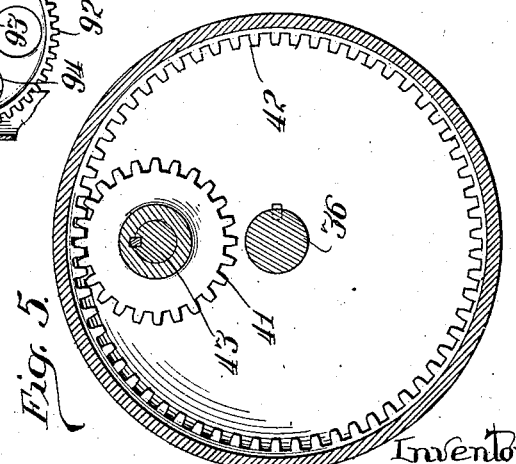
Inventor
George Manierre
By Daniel P. Brennan.
Attorney

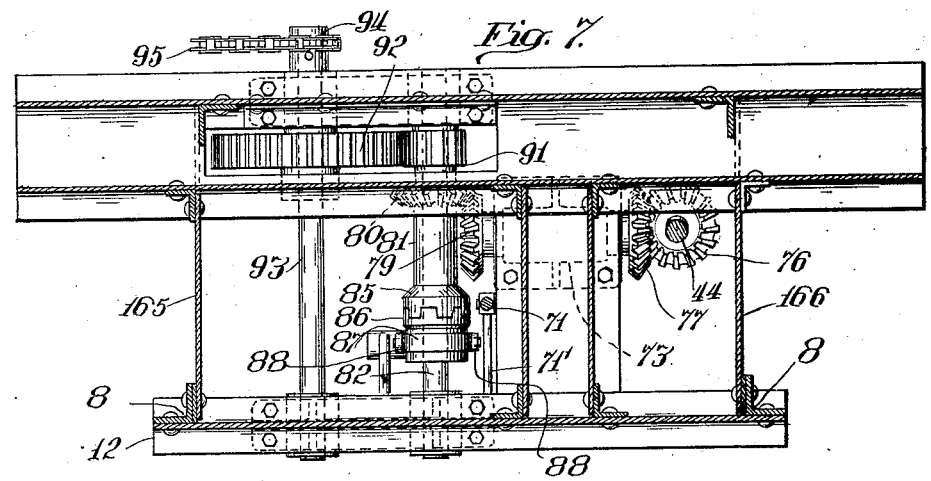

July 1, 1930.  G. MANIERRE  1,768,852
LOADING MACHINE
Filed July 31, 1926   5 Sheets-Sheet 5
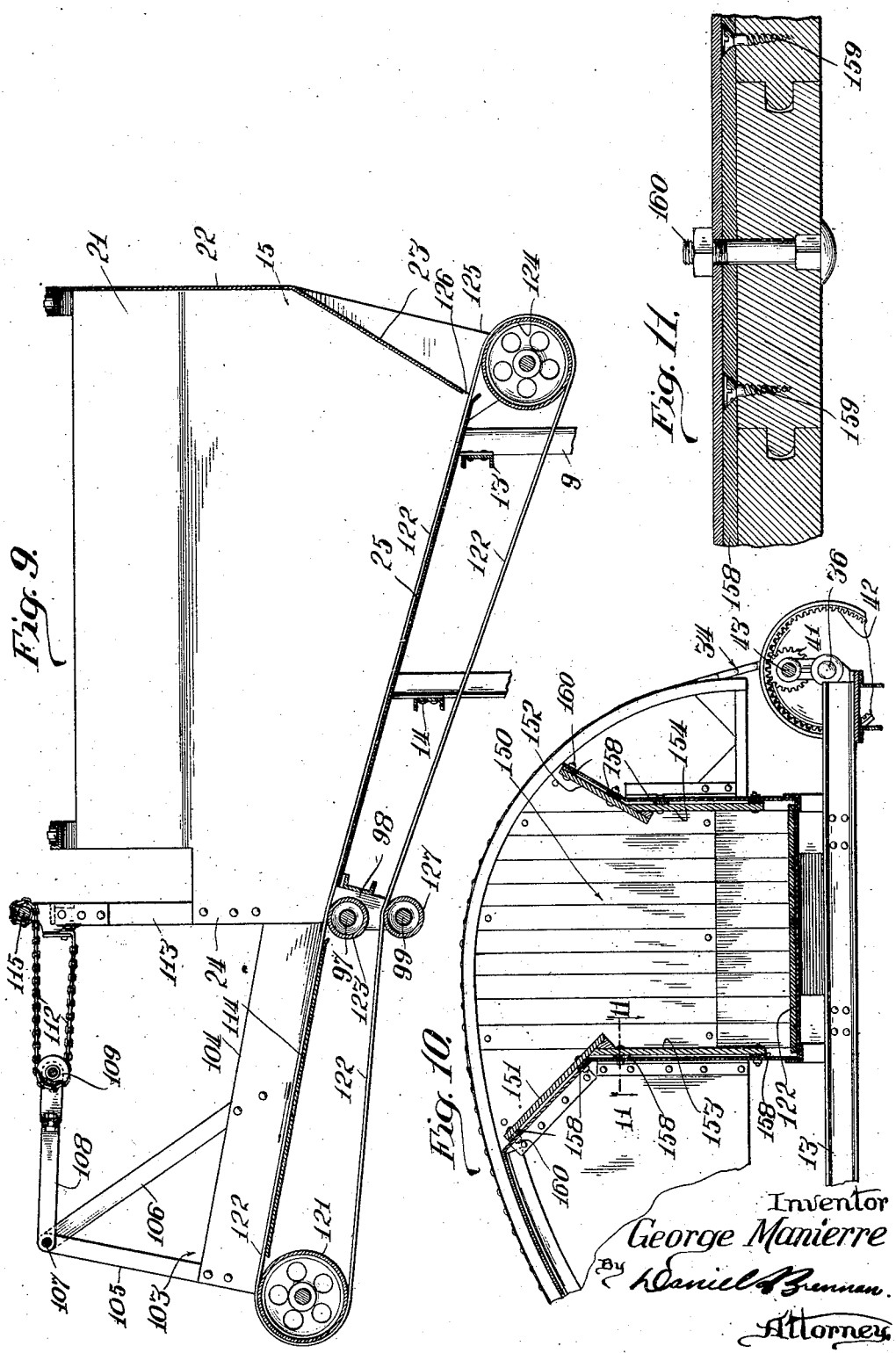
Inventor
George Manierre
By Daniel Brennan
Attorney Patented July 1, 1930

1,768,852

UNITED STATES PATENT OFFICE

GEORGE MANIERRE, OF MILWAUKEE, WISCONSIN

LOADING MACHINE

Application filed July 31, 1926. Serial No. 126,268.

This invention relates to improvements in loading machines.

It is an object of the invention to provide a self-propelled loading machine in which a scoop or shovel can be raised and lowered with respect to a hopper to which the charge from the shovel is to be transferred.

It is also an object of the invention to provide a machine of this character with means for transferring the load from the hopper into which it has been discharged to any other point, as for instance to a vehicle which is to be loaded.

Another object of the invention is to provide a loading machine of this character with load transferring or conveying means which may be adjusted to different heights to facilitate the transfer of the load from a hopper to desired points.

The invention also has the object of providing a loading machine with engine actuated propelling means and engine actuated hoisting mechanism, which last named mechanism is under the permanent control of the operator seated at that point of the machine from which he is also able to control the advance of the entire machine over the ground.

Another object of the invention is to provide a machine of this type wherein the control of the hoisting mechanism for raising a charging element to discharge position relatively to a hopper is independent of the control for the transfer mechanism thru which the load may be conveyed out of the hopper.

Another object of the invention is to provide in association with the means for controlling the hoisting mechanism and the means for controlling the movement of the conveyor, means for retarding the movement of the hoisting mechanism or for maintaining the load charging element temporarily in a raised position and to arrange all of the control elements within reach of the operator.

It is, furthermore, an object of the invention to provide a self-propelled loading machine with a conveyor for transferring the load discharged into a hopper to a point laterally of the machine, and to support a part of the conveyor by a structure which may be adjusted to various angular positions with respect to the main structure of the machine, the adjusting means of the conveyor structure including a self-locking transmission gearing for automatically retaining this structure in any desired adjusted position.

Another object of the invention is to provide in association with a loading machine ordinarily adapted for handling mineralic material such as ore or coal etc. means for the transportation of snow or other substances which ordinarily cannot be handled successfully in metal hoppers. It is, therefore, an additional object of the invention to provide an insert for a charging hopper which can readily be put in place or removed whenever desired to facilitate the handling of snow or other similar material.

With these and numerous other objects in view an embodiment of the invention is more fully described in the following specification in which reference is made to the accompanying drawings in which:

Figure 1 is a rear elevation of the machine;
Figure 2 is a side elevation of the same;
Figure 3 is a detail sectional view on line 3—3 of Fig. 2;
Figure 4 is a detail sectional view on line 4—4 of Figure 2 on a larger scale;
Figure 5 is a sectional view on line 5—5 of Figure 4;
Figure 6 is a detail elevation, partly in section, of the chain carrying the charging element;
Figure 7 is a horizontal sectional view on line 7—7 of Figure 4;
Figure 8 is a detail sectional view on line 8—8 of Figure 4;
Figure 9 is a longitudinal detail sectional view, partly in elevation, of the load receiving hopper;
Figure 10 is an elevation and partly section of a modified hopper, and
Figure 11 is a sectional view on line 11—11 of Figure 10, on a larger scale.

The machine comprises a tractor frame 1 for supporting an engine E which, through a suitable transmission T and controlled in the ordinary way, drives the rear wheels 2 having lugs for engaging link chains 3 of the type known as "caterpillar" tractor chains which are also trained about front wheels 4 supported in the substructure 1. The lower portion of each tractor chain 3 passes beneath a plurality of rollers 5 which are supported on beams 6 forming a part of the frame 1 of the machine.

A superstructure supported by the frame 1 consists in the embodiment shown of two upright posts 8 near the rear end and united at their lower ends by means of brackets 7 with the casing of the rear axle, as shown in Figure 1. Other posts 9 extend in pairs from the front end of the frame 1. An additional set of uprights 10 is located intermediate said corner posts 8 and 9, said uprights are arranged to supported longitudinal bars or angle irons 11. A transverse I-beam 12 connects at the top, the rear posts 8, and longitudinally disposed channels 13 and 14 are respectively secured to and disposed above and below the transversely disposed box beam 15 on which various mechanisms for controlling the operation of the machine are mounted from where said channels extend forward to the uprights 9.

The gusset plates which serve for uniting the longitudinal bars 11 with the front posts 9 also serve for the attachment of braces 16 which extend forward and outward and which are secured at their outer ends to suitably curved guide rails 17 extending from above the machine downward in front, where they are united by suitable brackets 18 with the main longitudinal beams 19. The upper ends of these guide rails 17 are fixed to a portion 20 of a box or hopper into which the material is to be loaded for transfer to a suitable conveyor.

This hopper 21 comprises two side and one end wall, of which the end wall 22, Figs. 2 and 9, is deflected inward at its lower portion to form an apron 23. The opposite end 24 is open and a slanting bottom 25 is provided, Fig. 9, supported by the upright posts and longitudinal beams of the frame work, said slanting bottom serving as a support for a portion of a conveyor to be hereinafter described. The two side walls 26 and 27 of the hopper 21 flare outward to facilitate the loading of the same, Figures 2 and 10.

A pair of scoop supporting arms 29 are secured to the ends of a shaft 30 supported in uprights 31. The arms 29 oscillate in planes outside the tractor wheels 2 and the chain 3. The arms extend forward of the machine and their free ends are attached to a charging element in the form of a scoop or shovel 32. In order to facilitate the movement of this charging element on the guide rails 17, the lateral walls of the shovel each carry a roller supported in a bracket 33.

Tension members in the form of link chains 34 are secured at one of their ends to the scoop and the other ends are attached to drums 35 fixedly secured to shafts 36 and 36' respectively which are supported in bearings 37 and 38 mounted on the transverse beam 15 located at the rear end of the machine. It is obvious that upon rotation of the shafts 36 and 36' carrying the keyed drums to which the two chains are fixedly secured, as shown in Figure 4, that the scoop or shovel 32 will be lifted and that during the lifting movement it will be gradually turned so as to discharge its contents into the hopper 21 upon reaching its upper position.

From Figures 2 and 6 it will also be noticed that the winding of the chains 34 on the pertaining drums 35 is facilitated by the provision of rollers mounted on the pintles arranged to ride on the rails or guide bars 17 of the links. Those rollers 39 which are associated with the links adjacent the drums 35 are of a smaller diameter than the rollers 40 adjacent the opposite end of the chains whereby the frictional pressure of the chain on the guide rails 17 is reduced owing to the larger rollers, and on the other hand, the winding of the chain on the drum 35 is accomplished through a smaller turning radius.

In order to impart a rotary movement to the drums 35 to wind the chains 34 one flange of each of these drums is formed with, or has an associated internal gear 42 arranged in mesh with a pinion 41. The pinions 41 are mounted on opposite ends of a shaft 43 supported in the bearings 37 secured to the top of the transverse beam structure 15.

The countershaft 43 receives its drive from the engine E through a transmission shaft 44 which is operatively connected at its lower end thereto and has at its top end a worm in engagement with a worm gear 46, said worm and worm gear being surrounded by and within a stationary casing 45.

A spider or wheel body 46' is rotatably secured on the shaft 43, the gear 46 being fixed thereto by a number of screws, and this gear 46 together with the worm (not shown) is supported in the casing 45 by suitable bearings and stuffing boxes surrounding the extended hub 48 of the spider 46', so that this gearing may run in an oil bath.

A clutch drum 50 is keyed at 51 to the countershaft 43 and a clutch actuating member is interposed between the said drum 50 and the extended hub 48 of the worm gear 46 whereby rotary movement of the gear 46 may be transmitted to the shaft 43 through the clutch drum 50.

A pair of gripping shoes 52 is disposed within the drum 50 adapted to engage the inner surface of the flange of the drum. The shoes are supported by a bracket 54 keyed to the extended hub 48 of the gear part 46 and therefore they rotate in unison. The shoes 52 are provided with central pockets 55 in slidable engagement with lugs 56 on the bracket 54. The shoes 52, furthermore, have oppositely located openings arranged in pairs and each containing a tapped sleeve 58 which is held against displacement therein. Screw spindles 59 have oppositely directed threads that enter the tapped sleeve 58. It is obvious that upon rocking or partially rotating said spindles 59 in one direction both shoes 52 will be forced outward into engagement with the flange of drum 52 so as to rotate it, and through it the shaft 43, and that upon a rocking movement of said spindles in the opposite direction the two shoes will be withdrawn from engagement with the flange whereby the rotary movement of said shaft 42 will be interrupted.

This partial rotation of the screw spindles 59 in the sleeves 58 is effected by a rocking movement of arms 60 projecting transversely from the center part of the spindles, and connected by means of links 61 to a sleeve 62 in feather connection with the extension 48 of the spider 46'. This sleeve 62 is loosely surrounded by a ring 63 in pivotal connection with a shifter fork 64 oscillatably secured on a bearing bracket 65 mounted on the transverse beam 15. A thrust bearing 66 is inserted between the shifter ring 63 and a flange 67 of the sleeve 62, another flange 68 being secured to the sleeve on the opposite side of the shifter ring 63.

It is obvious that upon rocking the fork 64 on its bracket 65 that the ring 63, and also the sleeve 62, will be displaced axially of the countershaft 43 and that the links 61 will impart a rocking or toggling movement to the arms 60, which movement will be transmitted to the screw spindles, whereby the gripper shoes will be moved inward or outward respectively in relation to the flange of the clutch drum 50.

Owing to the rotation of the drive shaft 43, the pinions 41 at its ends drive the internal gears 42 which are associated with the chain drums 35, so that the chains are thereby wound up on said drums, whereby the scoop 31 is raised to discharging position for loading the hopper 21.

The rocking movement of the fork 64 for shifting the sleeve 62 into one or the other positions is effected by means of an arm 70 secured to the pivot shaft on which the fork 64 is fixedly mounted. A link 71 pivotally secured to the free end of the arm 70 extends to another link 71' fixed on a rock shaft 72, as shown in Figures 1 and 4, which is supported in depending bored bosses of a bearing bracket 73 secured to the lower side of the transverse beam. A lever 74 also secured to the rock shaft 72 extends to a point within reach of the operator whose seat is indicated at 75 and who controls the advance or reverse movement of the entire machine as well as the steering in the ordinary way.

A bevel gear 76 mounted intermediate the ends of the inclined transmission shaft 44 is in permanent engagement with a bevel gear 77 on a jack shaft 78 rotatably supported in the bearing bracket 73. The opposite end of the shaft 78 also carries a bevel gear 79 in engagement with another bevel gear 80 fixedly mounted on a sleeve 81 (Figures 7 and 8) which loosely surrounds a short shaft 82 extending longitudinally of the machine and supported in bearings 83 and 84 secured to the beam structure 12 and 15 respectively.

The sleeve 81 secured against axial displacement on the shaft 82 has at the end opposite the bevel pinion 80 a clutch member 85 with teeth for cooperative engagement with a companion clutch member 86 which is feathered to the jack shaft 82, therefore, axially slidable on said shaft. The companion clutch member 86 is loosely surrounded by a ring 87 seated in a suitable groove of said member 86 and under the control of a shifting fork 88 which is pivotally connected to the lower end of a bracket 89 dependent from the beam 12. A lever 90 formed integral with the fork 88 extends downward to a position within reach of the operator whereby the clutch member 86 may be manipulated and shifted into or out of engagement with the member 85 on the sleeve 81.

Upon establishing clutch connection between the parts 85 and 86 rotation will be imparted to the jack shaft 82 on which a pinion 91 is fixedly mounted adjacent the bevel gear 80 of the sleeve 81. This pinion is in engagement with a gear 92 mounted on a second jack shaft 93 supported similarly to shaft 82, and carrying at one end fixedly attached thereto, a sprocket 94 over which a chain 95 is trained.

This chain also partly surrounds a sprocket 96 on a stub shaft 97', supported by a hanger bearing 98. Closely adjacent said shaft 97 there is mounted in the same hanger bearing and below the shaft 97, another shaft 99 (Figure 9). It will be obvious, therefore, that upon movement of the clutch parts 85 and 86 to operative engagement that the shaft 97 will be positively rotated.

This shaft supports in addition to the sprocket 96 another sprocket 100 of a slightly smaller diameter, as shown in Figure 1. A chain 101 is trained over this second sprocket 100 and is in driving relation with a sprocket 102 at the far end of the outrigger structure 103 pivoted on the shaft 97. This structure 103 comprises two parallel walls 104, Figure 9, and a bottom wall 114, with uprights 105 and braces 106 fixedly united to the walls. A transverse rod 107 connects the uprights 105 and supports pivotally a bail shaped element 108 to which is secured intermediate its ends a chain pulley 109. One end of the chain 112 which is trained about the pulley 109 is fixed to a cross brace connected to uprights 113 secured to extensions of the side walls 26 and 27 of the hopper 21 shown in Figures 1 and 9. The other end of the chain 112 is attached to a shaft 115 which is rotatably mounted above the uprights 113, this shaft also carrying at one end a worm pinion 116 in engagement with a worm 117 supported in a bracket 118 above the uprights 113. The shaft of the worm 117 extends beyond the bracket 118 and carries at its free end a chain sprocket 119 over which the manually operable chain 120 is trained.

It is obvious, therefore, that upon rotation of the sprocket 119 effected by pulling one or the other portion of the chain loop 120, rotation is imparted through the worm 117 to the worm gear 116 on the shaft 115, whereby the chain 112 is either wound or unwound therefrom. When the chain 120 is unwound the entire outrigger structure 103, owing to its weight and to the fact that it is pivotally mounted adjacent its lower inner corner on the shaft 97, will drop by gravity until it reaches the position indicated in dotted lines in Figure 1. A pulling action on the other strand of the chain 120 will again raise this section of the outrigger to the full line position. The worm gear transmission 115, 116 and 117 interposed in the actuating mechanism for the raising and lowering of the outrigger structure 103 is self locking whereby the entire structure may be maintained in any desired intermediate position.

The shaft 110 on which the sprocket 102 for the chain 101 is secured, also supports a pulley 121 (Figure 9) over which a conveyor belt 122 is trained and it is obvious that upon clutch engagement of the parts 85 and 86 (Figure 8) that a positive rotary movement is imparted to the pulley 121 for driving the conveyor belt 122. The upper portion of the belt 122 is supported intermediate its ends by the bottom plate 114 forming part of the outrigger structure, while another portion of the belt 122 rests on the bottom 25 of the hopper 21. Adjacent that point at which the outrigger structure 103 adjoins the hopper 21, the belt supporting plates 114 and 25 are separated by a gap, at which point the belt is supported by a roller 123 rotatably mounted on the shaft 97. The belt 122 is also trained over a loose pulley 124 which is supported in brackets 125 depending from the walls of the hopper 21. The slanting wall portion 23 forming the lower part of the end wall 22 of the hopper terminates a short distance above the plane of movement of the belt 122, thereby leaving a narrow gap 126 as shown in Figure 9. The lower section of the belt 122 is supported intermediate the pulleys 121 and 124 by an idler roller 127 on the shaft 99.

When it is desired to retard the speed of the shaft 43, as for instance to prevent the scoop from descending too rapidly upon unwinding the scoop supporting chains from the pertaining drums, the clutch drum 50 is subjected to a braking action. A brakeband 130 for this purpose encircles the flange of the drum, and one end of this brakeband 130 is pivotally secured to a lever plate 131 fixed to the rock shaft 132, while the other end of the brakeband 130 is adjustably attached by means of the bolt 134 to another point of the lever plate 131. An arm 135 fixed to the rock shaft 132 carries at its free end a link rod 136 extending downward to a point near the foot of the operator, where it is associated in a suitable way with a pedal 137 (Figure 1) which may be easily actuated by the operator. Upon depressing this pedal a downward movement will be imparted the lever plate 131 to force the brakeband into tight gripping engagement with the flange of the drum.

The upward movement of the scoop 32 to discharging position with respect to the hopper 21 is yieldingly limited by a stop, formed as shown in Figures 1 and 3, by a finger 140 angularly projecting from a bar 141, the lower end of which is secured to a spring 142 having its lower end anchored to the guide rail 17 near the lower end thereof. The projecting finger 140 overlies the angular lever 143 secured at one end to an extension of an end wall 22 of the hopper and to the guide rail 17.

When the link chains 34 are being wound on the chain drums 35, the scoop 32 will be raised. One of the arms 29 or both of them may have a stop engaging angle 144 which upon upward swinging movement of the arm 29 will strike the projecting finger 140 so that the continued swinging movement of the arm 29 will take place by overcoming the tension of the spring 142.

Means are provided for automatically effecting the disconnection of the clutch for driving the winding drums upon approach of the scoop to discharge position. A lever 145 is pivoted at 146 to a longitudinal beam 13 of the superstructure and this lever also has a laterally projecting finger 147 on top extending into the path of the arm 29. The pin 146 on which the lever 145 is mounted has a downward projecting arm in pivotal connection with a link 148 movably secured at its other end to the clutch control lever 74, which extends within reach of the operator. Upon engagement of the arm 29 with the laterally projecting finger 147 of the lever 145 a forward movement is imparted through the link 148 to the clutch control lever 74 whereby the clutch is disconnected and further elevation of the scoop 31 is interrupted. The ultimate rising movement of the arm 29 takes place by overcoming the action of the spring 142.

In order to prevent the scoop 32 from dropping and unwinding the chains thereby from the drum 35, whose shaft is now freely rotatable, the operator may actuate the brake pedal 137 thereby applying the brakes to the shaft and preventing its rotation under the weight of the scoop. If he desires to lower the scoop he releases this brake slightly and the scoop will descend gradually.

While the machine is described as primarily intended for loading sand, coal, or ore, etc., it also has been successfully operated for the purpose of removing snow piled up on streets. A hopper especially constructed and adapted for the conveyance of snow is illustrated in Figures 10 and 11. For this purpose a wooden insert may be placed into the metal hopper 21 described above. This insert consists of a box 150 open at its upper and lower ends, and having on the front and rear walls inclined portions 151 and 152 and vertical portions 153 and 154, these front and rear walls being associated with lateral walls. This wooden insert will prevent the snow delivered by the scoop from adhering too securely to the walls of the metal box of which the hopper 21 is formed. The insert is composed of wooden boards which are interconnected in the ordinary way, as shown in Figure 11 by tongues and grooves and are rigidly held together by means of flat spacer bars 158 which also serve as a skeleton structure for the entire insert. The boards are secured to these flat strips by screws 159, Figure 11, and the entire insert 150 is held in position within the hopper 21 by bolts 160 of which any desired number may be used. An accidental rotation of the bolts in the pertaining openings is avoided through the provision of squared portions underneath the head of the bolts, such as are provided on the conventional carriage bolt, these squared portions being seated in suitable recesses of the respective boards while the bolts extend through the openings in the flat bars 158 and in the walls of which the hopper is composed.

The operation of the device will be clear from the above description. In order to bring the entire machine to the place where it is to be used the scoop 32 is raised slightly from the ground so as to clear uneven or projecting portions in the roadbed. The engine transmits a rotary movement to the rear wheels 2, whereby the self-laying track device 3 is operated and the machine advances. After having arrived at the place of use, the scoop 32 is lowered into the position shown in Figure 2, and in this position the machine is advanced into material which is to be loaded. The operator then actuates the lever 74 for imparting a rocking movement to the sleeve shifting fork 64 for forcing the shoes 52 into flange engaging position with the drum 50. Since this drum is keyed to the shaft 43 and since this shaft is then rotated, the drums 35 are rotated and wind up the chains 34.

When an arm 29 engages the lateral finger 147 of the lever 145, this lever is rocked, thereby pulling the link 148 towards the front end of the machine and as this link is connected with the lever 74 for operating the clutch shoes 52 this lever will be actuated thereby automatically and return the sleeve 62 into its original position whereby the shoes 52 are moved out of engagement with the flange of the drum 50. Therefore, as the arms 29 continue in their movement, they are finally yieldingly arrested through their engagement with the projecting finger 140 attached to the bar 141 which is connected by the spring 142 with the guide rails 17.

In order to prevent the scoop from returning immediately to its lowermost position the operator depresses the pedal 137 in front of his seat thereby imparting a downward movement to the link 136 which will apply the brakeband 130 to the outer circumference of the clutch drum 50 whereby a further rotation of the shaft 43 in any direction is prevented and the chain drums 35 are thereby prevented from rotating and unwinding the chains under the gravity action of the scoop.

While the hopper is being filled or subsequent to the filling of the hopper, the conveyor 122 may be driven to carry the material deposited in the hopper to the place of its destination. For this purpose the operator by means of the lever 90 actuates the clutch members 85 and 86 for imparting rotation to the shaft 93, through its connecting mechanism. The shaft 93 actuates the transmission chain 95 which is trained about the sprocket 96 located intermediate the ends of the conveyor 122. The chain 101 extending from the last named sprocket drives the shaft 110, on which the roller 121 is mounted, about which the conveyor belt 122 is trained thereby imparting movement to the conveyor.

From Figure 9 it will be seen that in this manner the entire charge deposited in the hopper will be carried along by the conveyor beyond the end of the outrigger structure 103 from where it will be discharged into a suitable vehicle or other suitable place. While the coarse material is carried by the conveyor belt 122, the fine material will slide through the gap 126 in the rear wall of the hopper, traveling thereby in a direction opposite the direction in which the conveyor travels, and the discharge of this fine grit or sand or dust is facilitated owing to the slanting arrangement of the conveyor belt itself. This fine material may then either be returned to the heap from which the entire load has been taken or it may be separately collected by means of a suitable receptacle, not shown.

While the machine is traveling to the place at which it is to be used, the outrigger itself may be turned downward to reduce the entire machine to the more compact form indicated in dotted lines in Figure 1. To accomplish this the operator pulls the chain 120 by which the worm transmission 115, 116 and 117 is actuated so that the tension member 112 by which the outrigger 103 is suspended, is unwound from the chain shaft 115. The inclination of the outrigger with respect to the machine may be determined selectively since the hoisting device for the outrigger contains a self-locking gearing thereby permitting the conveyor to be disposed to discharge at a plurality of different positions.

It will be seen that the entire machine presents an extremely strong construction suitable to withstand the severe handling and strains to which machines of this character must necessarily be exposed, and the operating parts are in the main enclosed in casings, as for instance the worm gear and worm thru which the drive is transmitted to the countershaft 43.

It will also be noticed that the manipulating levers for controlling the various operative steps are located immediately in front of the driver's seat so as to be easily visible and accessible to him at any time while he occupies the seat 75. It will also be seen that the clutch elements for effecting or interrupting respectively the drive to the conveyor as well as the manipulating levers are enclosed at both sides between plates 165 and 166, whereby a compartment for these elements is created in which they are arranged in a compendious form so as to permit their inspection at any time.

Without desiring to limit myself to the exact construction as illustrated and described and pointing out that this construction is disclosed as a preferred embodiment of the invention only, I claim:

1. In combination with an engine propelled vehicle, a frame for the same, a superstructure, curved guide rails supported by said frame and superstructure, a pair of said chains guided on said rails, a load receiving scoop carried on one end of said chains, a pair of chain drums to which the other ends of said chains are fastened respectively, shaft fixedly supporting said chain drums, and an internal gear drive controlled by the engine of the vehicle and associated with said shafts for rotating drums.

2. In combination with an engine propelled vehicle having a frame, a superstructure supported by said frame, guide rails carried by said frame and superstructure, a pair of chains traveling on said guide rails, a load receiving scoop to which the ends of said chains are fastened, chain winding drums to which the other ends of said chains are secured, shafts for the chain drums supported on the superstructure, said chain drums being each associated with an internal gear, another shaft having gears at its ends in engagement with the internal gears associated with the chain drums, and means under selective control of the operator of the engine for driving said last named shaft from the engine propelling the vehicle.

3. In a device of the character described, the combination of an engine propelled vehicle, having a frame, a superstructure erected on the frame, guide rails carried by the frame and superstructure, a load receiving scoop, chains traveling over said guide rails, each of said chains having one end attached to said load receiving scoop and another end attached to a chain winding drum, the chains comprising links and rollers, the rollers interposed between links adjacent the winding drums being of a smaller diameter than the rollers pertaining to the links adjacent the scoop to facilitate the smooth winding of the chains on the drums, and means under control of the engine of the vehicle for winding the chains on said drums.

4. In a device of the character described, the combination of an engine propelled vehicle, having a frame, a superstructure on the frame, guide rails carried by the superstructure and the frame, a load receiving scoop, chains trained over the guide rails and having one end attached to the load receiving scoop, chain winding drums rotatably mounted on the superstructure, the other ends of the chains being secured to said chain winding drums, a transmission shaft continuously driven by the engine, a countershaft, a clutch member loose on the countershaft, and continuously actuated from said transmission shaft, another clutch member fixedly secured to said countershaft, means under control of the operator for effecting operative connection between the two clutch members for driving the countershaft, and an internal gear drive interposed between said countershaft and the chain winding drums for imparting a rotary movement to said winding drums.

5. In a device of the character described, the combination of an engine propelled vehicle, having a frame, a superstructure mounted on the frame, guide rails carried by the superstructure and the frame, chains trained over said guide rails, a load receiving scoop supported by said chains at one end thereof, chain winding drums to which the other ends of the chains are secured, internal gears associated with said chain winding drums, a countershaft carried by the superstructure, pinions on said countershaft in engagement with said internal gears, a transmission shaft interposed between the engine and the countershaft, a member loosely rotatable on the countershaft and with which said transmission shaft is in operative connection, a clutch member operatively secured to said loose member, a clutch drum fixedly secured to the countershaft.

operator controlled means for displacing the clutch member on the countershaft to drum driving position, and operator controlled means for exerting a braking effect on the outer surface of said clutch drum.

6. In a device of the character described, the combination of an engine propelled vehicle, a frame for the same, a superstructure comprising upright posts, and transverse beams supported by said posts, engine actuated mechanisms for operating load transferring elements, and a conveyor respectively, and control elements for said mechanisms, said control elements being supported from said transverse beams, and an operator's seat on the frame located with respect to said transverse beams to bring the control elements within reach of an operator having taken his position in the seat.

7. In a device of the character described, an engine propelled vehicle, a loading scoop, a guide frame for the scoop extending from the charging to the discharging position of the scoop, engine actuated hoisting mechanism for said scoop, scoop carrying arms, a stop element projecting into the path of the arms, and a spring acting on the stop element, the stop element being located at the discharge position and the spring being anchored on the guide frame adjacent the charge position of the scoop.

8. In a device of the character described, the combination of an engine propelled vehicle, a loading scoop, engine actuated hoisting mechanism for the loading scoop, guide rails on which the scoop travels, scoop guiding arms, a stop element near the upper end of the guide rails and projecting into the path of the guide arms, and a spring extending from the stop element to the lower end of the guide rails.

9. In a device of the character described, a vehicle, a metal hopper, loading mechanism for the hopper, a wooden insert for the hopper comprising boards, metal bars uniting the boards, and means for fastening the metal bars of the insert to the metal walls of the hopper.

10. In a device of the character described, a vehicle, a metal hopper carried thereby, loading mechanism for the hopper and a wooden insert removably fitted in the interior of the metal hopper, said wooden insert consisting of boards, metal bars on the outside of the insert uniting said boards, and fastening means passing through the metal bars and through the walls of the hopper for securing the casing to the hopper.

11. In combination with an engine propelled vehicle, a frame for the same, a superstructure, curved guide rails supported by said frame and superstructure, a pair of chains guided on the rails, a load receiving scoop connected with said chains, a pair of chain drums to which said chains are secured respectively, a shaft fixedly supporting said drums, and a gear drive controlled by the engine of the vehicle and associated with said shaft for rotating the drums.

12. In combination with an engine propelled vehicle having a frame, a super-structure supported by the frame, guide rails carried by the frame and super-structure, a pair of chains traveling on the guide rails, a load receiving scoop to which the ends of said chains are fastened, chain winding drums to which the other ends of said chains are secured, shafts for the chain drums supported on the super-structure, said chain drums being each associated with a gear, another shaft having gears at its ends in engagement with the first named gears, and means under selective control of the operator of the engine for driving said last named shaft from the engine propelling the vehicle.

13. In a device of the character described, the combination of an engine propelled vehicle having a frame, a super-structure on the frame, guide rails carried by the super-structure and the frame, a load receiving scoop, chains trained over the guide rails and having one end attached to the load receiving scoop, chain winding drums rotatably mounted on the super-structure, the other ends of the chains being secured to said drums, a transmission shaft continuously driven by the engine, a counter shaft, a clutch member loose on the counter shaft and continuously actuated from said transmission shaft, another clutch member fixedly secured to said counter shaft, means under control of the operator for effecting operative connection between the two clutch members for driving the counter shaft, and a gear drive interposed between said counter shaft and the chain winding drums for imparting a rotary movement to said winding drums.

14. In combination with an engine propelled vehicle, a frame for the same, guide rails supported by the frame, a load receiving scoop, means actuated by the engine of the vehicle for moving the scoop along said guide rails, and rollers carried by the scoop and in engagement with said guide rails at any position to which the scoop has been moved by the actuating means.

15. In combination with a vehicle, a frame for the same, guide rails supported by the frame, a scoop, a pair of chains secured to said scoop and trained over said guide rails, and means for winding and unwinding said chains while they remain in engagement with said guide rails to lift or lower the scoop.

16. In combination with a vehicle, a frame for the same, a pair of guide rails, a scoop, arms pivotally mounted in the frame attached to said scoop, means for supporting said scoop on said guide rails in any position of the clutch, a pair of chains trained over the guide rails and attached to the scoop, and means for actuating said chains.

In testimony whereof I affix my signature at 5054 Plankington Building, Milwaukee, Wisconsin.

GEORGE MANIERRE.